April 3, 1956  G. B. E. SCHUELER  2,740,403
ADHESIVE BANDAGES
Filed Nov. 20, 1953

Inventor:
George Berthold Edward Schueler,
by Singer, Stern & Carlburg,
Attorneys.

United States Patent Office 2,740,403
Patented Apr. 3, 1956

2,740,403

ADHESIVE BANDAGES

George Berthold Edward Schueler, Hyde, England, assignor to T. J. Smith & Nephew Limited, Hull, England, a British company Application November 20, 1953, Serial No. 393,476

3 Claims. (Cl. 128—156)

This invention relates to adhesive bandages for medical and surgical purposes of the type coated with a rubber base or similar adhesive, and has for its object so to manufacture and form such bandages that they not only overcome disadvantages of such bandages as hitherto made, but give additional advantages.

In general, in accordance with the present invention an adhesive bandage for medical and surgical purposes is formed as a two-ply bandage, that is, from two thicknesses laminated together, one of which thicknesses (herein termed the backing) is made from a porous fabric —which can be a woven fabric, a perforated sheet or film, an impregnated sheet, or the like—and which can be elastic in one or both directions or non-elastic; whilst the other thickness (herein termed the carrier) is formed from an open-mesh fabric, preferably woven, which may be elastic in one or both directions or non-elastic, and is impregnated or coated with an adhesive of the water-resistant type such as a rubber adhesive, in such manner that the treated fabric remains a substantially porous structure, the carrier being adhered to one surface of the backing to constitute the two-ply bandage having one surface (that of the carrier) adhesive and the other (that of the backing) dry and if desired washable in situ.

Where the two-ply bandage is to be elastic, obviously both the backing and the carrier adhered thereto must be similarly extensible.

The backing can be made in any manner from suitable flexible sheet material as a porous fabric, which can be woven or even formed from a perforated sheet or film or an otherwise porous flexible sheet which is impregnated.

The structure may be such that in no case is it adhesive on its exterior but, although not always necessary, yet in certain circumstances it can have some adhesive, preferably diluted, applied to its interior surface just prior to securing the carrier thereto and in such manner that it remains substantially porous. Preferably although it has "breathing" pores, it is washable to allow the applied bandage to be washed in position on a limb or the like without in any way spoiling the effect of the bandage as such.

The carrier, also, can be formed in a great variety of manners. It may be woven, knitted or otherwise formed to give an open-mesh fabric which is subjected to an impregnation treatment with the adhesive and then after impregnation can also be given an additional coating on its outer surface and in any case in the result, so that by differential pressure treatment, striking off, doctoring, or otherwise, it still presents, although impregnated, a substantially porous structure.

In any case, subsequent action is taken whereby it is united by adhesion to one surface of the backing with which it is co-extensive, or possibly less so in the width. This adhesion may be over the total area or part thereof.

After uniting the thicknesses, the outer surface of the carrier may have an additional adhesive in dilute form applied thereto so that its outer surface is definitely adhesive.

In most cases the carrier is formed from ordinary cotton open-mesh fabric which normally is used for non-adhesive bandages. By impregnating this fabric with the adhesive there is obtained an adhesive ply or layer which is substantially porous or can be so rendered and if necessary by repeating such operations with a suitable diluted adhesive an adequate amount should adhere to said fabric on its outer surface to give sufficient potential adhesion to the skin of the patient. In any case, steps may be taken by air pressure, stripping or doctoring so that such cotton open-mesh fabric has the requisite porosity fully defined.

Again, to attain the same object, the ordinary cotton open-mesh fabric can be passed through a thicker adhesive and later by close striking off or blowing an air current through the openings and disposing of the surplus adhesive there is obtained a sufficiently heavily impregnated and coated fabric which at the same time has the necessary porosity.

In order that the invention may be better understood, it will now be described with reference to the accompanying diagrammatic drawings which are given by way of example only and in which.

Figure 2:
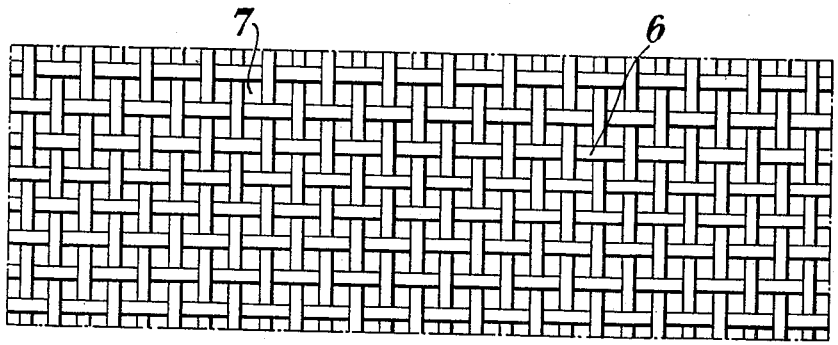
Fig. 2 is a view from above of the upper ply of the bandage shown in Fig. 1.
Figure 1:
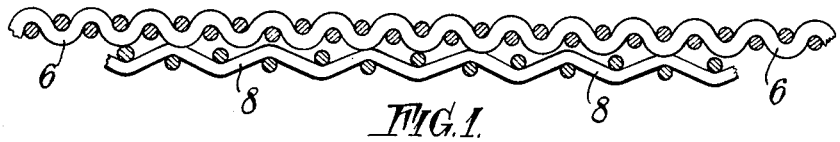
Fig. 1 is a diagrammatic cross section, greatly enlarged, for example about twenty-five times full size, of a portion of a two-ply bandage according to an embodiment of the invention.
Figure 3:
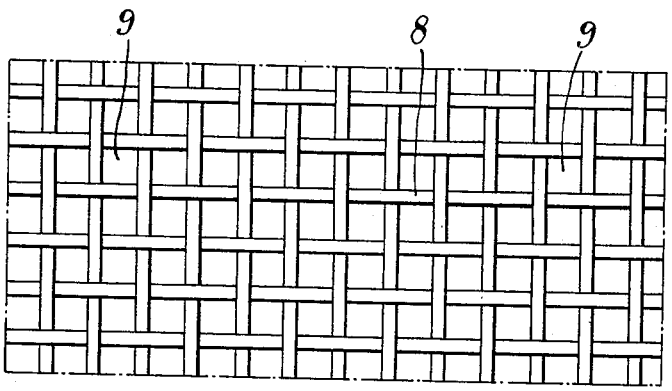
Fig. 3 is a view from below of the lower ply of the bandage shown in Fig. 1.

Regarding the embodiment shown in Figs. 1 to 3, it is reiterated that these views are completely diagrammatic and represent a magnified portion of the two-ply fabric.

Generally, the upper ply represented by the numeral 6, which is the backing, is a a closely woven fabric for example having say one hundred yarns to the inch with openings 7 between, these openings for example, and as shown, being squares of some 0.005" side. Thus, although the woven fabric is closely woven, it is pervious.

The lower ply 8, which is a similar fabric but more openly woven so that the spaces between the yarns leave openings 9 of say some 0.01" side, is impregnated or coated with the rubber or other adhesive and treated as above set forth so that it has the necessary porosity, is adhered to the underside of the backing 6 in any of the manners herein described.

In this manner there is produced a two-ply surgical bandage fulfilling all the purposes of the invention.

Figure 4:
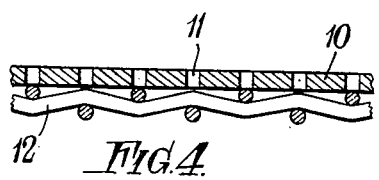
Fig. 4 is a similar view to Fig. 1 but of another embodiment of the invention.
Figure 5:
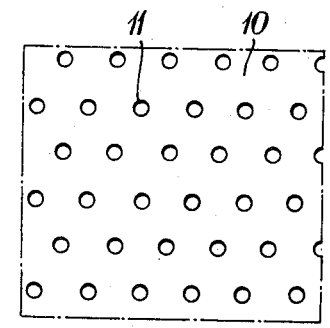
Fig. 5 is a view from above of the upper ply of the bandage shown in Fig. 4.

In the embodiment shown in Figs. 4 and 5, the backing in place of being a closely woven fabric, is formed from a flexible plastic film 10 which may be some few thousandths of an inch thick and is porous in its structure or rendered porous by treatment, the porosity being indicated diagrammatically in the views by the apertures 11. This has adhered to its underside the other ply 12 (similar to the ply 8) which is impregnated with or carries the adhesive and which has the necessary porosity in any manner as herein set forth.

Neither of the exemplifications shown in Figs. 1, 2 and 3 and Figs. 4 and 5 need be stretchable in either direction. On the other hand, they can be stretchable in one or the other direction. For example, all or some of the warp threads in Figs. 1, 2 and 3 can be stretchable or all or some of the weft threads in the same figures can be stretchable; in any case the stretchability characteristic of the two plies is made similar.

Similarly, the backing or film 10 can be stretchable in one or both directions in the embodiment shown in Figs. 4 and 5, the carrier ply 12 being in any case similarly stretchable.

For the purposes of lamination, various steps or arrangements may be taken. In general, the means are such that one adhesive surface of the carrier is pressed on to one surface of the porous backing through calendering or like rollers, to leave the outer surface of the carrier adherent for the bandage operation.

In certain circumstances for adequate but partial area adhesion the arrangement may be such that there are definite pressure lines, longitudinal, diagonal or otherwise, on one of the rollers so that although the carrier is definitely united with the backing, it is not adherent thereto over the whole of the surface thereof but only on the pressure lines. For this or other purposes one or both of the rollers may be heated.

It will be appreciated from the above that it is not necessary to form a special kind of carrier for each different type of backing but that what may be termed a common impregnated or coated carrier can be manufactured to be utilised with a great variety of backings, thus giving economy in manufacture.

In other cases the backing can be formed from an open-mesh fabric, cotton, rayon, paper or the like impregnated with a plastic, starch or similar solution, emulsion or partially polymerised paste, which is dried off in any suitable manner, for example by passing through an oven or through calender rolls, steps being taken in all cases for the mesh openings or perforations, or a sufficient proportion thereof, to be left to give adequate passage for air.

The backing can also be made from woven acetate rayon yarn or other thermoplastic yarn and by hot calendering, swelling with solvent or similar treatment, caused to close to some extent the open mesh of the weave to leave the necessary minute openings for porosity and for resisting the penetration of dirt from the exterior.

The invention is not limited to the precise forms, processes or details herein described, as these may be varied to suit particular requirements.

What I claim and desire to secure by Letters Patent of the United States of America is:

1. An adhesive bandage for medical and surgical purposes, comprising a backing thickness of porous fabric, and a carrier thickness of an open-mesh fabric impregnated with adhesive in such a manner that the open-mesh fabric remains a substantially porous structure, said carrier thickness being adhered to one surface of the backing thickness to constitute a two-ply bandage having one outer surface adhesive and the other outer surface non-adhesive.

2. An adhesive bandage as claimed in claim 1, in which the backing and the carrier thicknesses are each formed elastic and extensible in a similar manner, both the backing and carrier thicknesses being of substantially the same degree of elasticity and extensibility.

3. An adhesive bandage as claimed in claim 1, in which the adhesion between the backing and carrier thickness is only over a part of the coincident area thereof.

References Cited in the file of this patent

UNITED STATES PATENTS

| | | |
|---|---|---|
| 1,370,413 | Crowell | Mar. 1, 1921 |
| 2,039,312 | Goldman | May 5, 1936 |
| 2,093,910 | Farrell | Sept. 21, 1937 |